United States Patent
Okada et al.

(10) Patent No.: US 8,170,797 B2
(45) Date of Patent: *May 1, 2012

(54) METHOD AND APPARATUS FOR ESTIMATING BEHAVIORS OF VEHICLE USING GPS SIGNALS

(75) Inventors: Minoru Okada, Gifu (JP); Mamoru Sawada, Yokkaichi (JP); Takehito Fujii, Anjo (JP); Hiromichi Tanaka, Tokai (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/928,806

(22) Filed: Dec. 20, 2010

(65) Prior Publication Data

US 2011/0093198 A1 Apr. 21, 2011

Related U.S. Application Data

(62) Division of application No. 11/881,173, filed on Jul. 26, 2007, now Pat. No. 7,885,765.

(30) Foreign Application Priority Data

Jul. 26, 2006 (JP) .................................. 2006-203643

(51) Int. Cl.
*G06F 19/00* (2011.01)
(52) U.S. Cl. ............................ 701/470; 701/469; 342/58
(58) Field of Classification Search .................. 701/214, 701/215, 213; 342/357.24, 358, 359
See application file for complete search history.

(56) References Cited

U.S. PATENT DOCUMENTS

| | | | | |
|---|---|---|---|---|
| 4,881,080 A | * | 11/1989 | Jablonski | 342/357.36 |
| 5,101,356 A | * | 3/1992 | Timothy et al. | 701/213 |
| 5,349,531 A | * | 9/1994 | Sato et al. | 701/215 |
| 5,408,411 A | * | 4/1995 | Nakamura et al. | 701/48 |
| 5,541,845 A | * | 7/1996 | Klein | 701/207 |
| 5,657,025 A | * | 8/1997 | Ebner et al. | 701/300 |
| 6,088,653 A | * | 7/2000 | Sheikh et al. | 701/214 |

(Continued)

FOREIGN PATENT DOCUMENTS

EP  0 763 749  3/1997

(Continued)

OTHER PUBLICATIONS

Office Action dated Dec. 7, 2010, in corresponding Japanese Application No. 2006-203643, with English translation thereof.

(Continued)

*Primary Examiner* — Helal A Algahaim
(74) *Attorney, Agent, or Firm* — Harness, Dickey & Pierce, PLC

(57) ABSTRACT

A method and an apparatus for estimating behaviors of a vehicle are provided. At least two GPS antennas are located along a longitudinal axis of a vehicle so that speed vectors at the positions where the GPS antennas are located can be determined based on GPS signals received by the GPS antennas. The speed vectors are known to be estimated with high accuracy based on the GPS signals. The positions of the GPS antennas on the local coordinate system are estimated based on such highly accurate speed vectors, so that the estimated positions may also have high accuracy. Based on a line connecting these highly accurate positions of the GPS antennas, an inclination of the longitudinal axis of the vehicle is estimated. Use of the high-accuracy speed vectors enables high-accuracy estimation on the positions of the GPS antennas and the vehicle direction on the local coordinate system.

5 Claims, 6 Drawing Sheets

U.S. PATENT DOCUMENTS

| | | | |
|---|---|---|---|
| 6,191,732 B1 * | 2/2001 | Carlson et al. | 342/357.3 |
| 6,259,999 B1 * | 7/2001 | Pantle | 702/153 |
| 6,650,287 B1 * | 11/2003 | Karpov et al. | 342/357.3 |
| 6,694,226 B2 * | 2/2004 | Tobaru et al. | 701/1 |
| 6,754,584 B2 * | 6/2004 | Pinto et al. | 701/215 |
| 7,065,440 B2 * | 6/2006 | Aral | 701/50 |
| 7,136,751 B2 * | 11/2006 | Pinto et al. | 701/215 |
| 7,164,985 B2 * | 1/2007 | Takazawa | 701/200 |
| 7,286,933 B2 * | 10/2007 | Cho | 701/216 |
| 7,289,898 B2 * | 10/2007 | Hong et al. | 701/96 |
| 7,400,956 B1 * | 7/2008 | Feller et al. | 701/41 |
| 7,418,364 B1 * | 8/2008 | Horton et al. | 702/153 |
| 2002/0165669 A1 * | 11/2002 | Pinto et al. | 701/213 |
| 2002/0177950 A1 * | 11/2002 | Davies | 701/213 |
| 2003/0078705 A1 * | 4/2003 | Kumar et al. | 701/13 |
| 2003/0135327 A1 * | 7/2003 | Levine et al. | 701/220 |
| 2003/0149512 A1 * | 8/2003 | Hrovat et al. | 701/1 |
| 2003/0216865 A1 * | 11/2003 | Riewe et al. | 701/220 |
| 2004/0098187 A1 | 5/2004 | Nakao | |
| 2005/0060093 A1 * | 3/2005 | Ford et al. | 701/214 |
| 2005/0113992 A1 | 5/2005 | Kitano | |
| 2007/0149219 A1 * | 6/2007 | Lee et al. | 455/456.3 |
| 2007/0150192 A1 * | 6/2007 | Wakamatsu et al. | 701/213 |
| 2008/0269963 A1 * | 10/2008 | Vos et al. | 701/4 |

FOREIGN PATENT DOCUMENTS

| | | |
|---|---|---|
| JP | 08-160119 | 6/1996 |
| JP | H11-254993 | 9/1999 |
| JP | 2002-286829 | 10/2002 |
| JP | 2004-175349 | 6/2004 |
| JP | 2005-186739 | 7/2005 |
| JP | 2005-315721 | 11/2005 |
| JP | 2006-044316 | 2/2006 |
| WO | WO 2005/119290 | 12/2005 |

OTHER PUBLICATIONS

Search Report dated Nov. 21, 2007 in GB Application No. 0714521.2.

Office Action dated Apr. 30, 2009 in corresponding DE Application No. 10 2007 034 354.1.

Gruber, F.J., Formelsammlung fur das Vermessungswesen (Collection of Formulae for Surveying) $7^{th}$ ed., Bonn: Ferd. Dummlers Verlag, (ed.) 1995, p. 31.

* cited by examiner

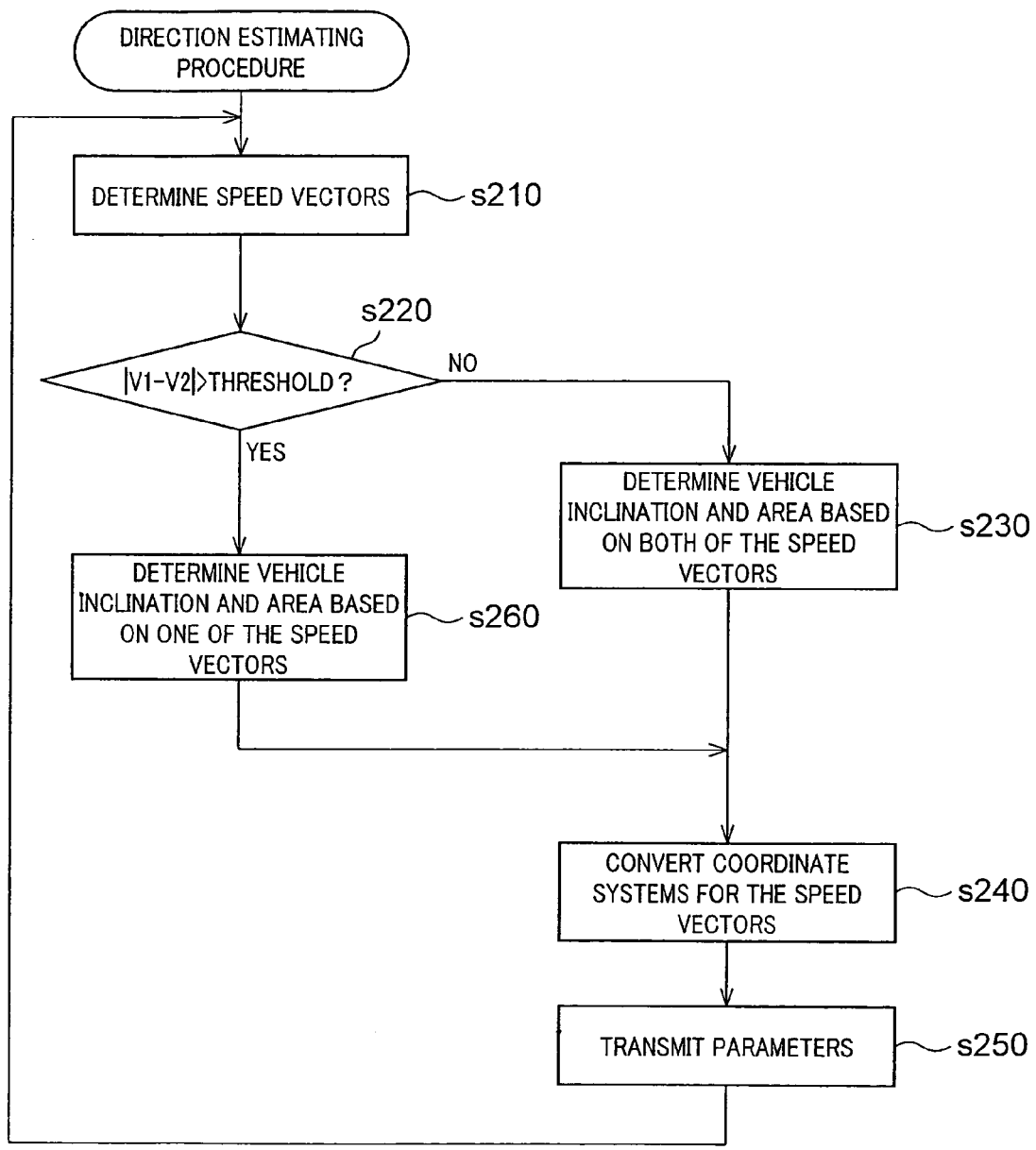

GROUND HORIZONTAL PLANE

METHOD AND APPARATUS FOR ESTIMATING BEHAVIORS OF VEHICLE USING GPS SIGNALS

CROSS-REFERENCE TO RELATED APPLICATION

This application is a divisional of U.S. patent application Ser. No. 11/881,173 filed on Jul. 26, 2007 now U.S. Pat. No. 7,885,765. This application claims the benefit and priority of Japanese Patent Application No. 2006-203643 filed Jul. 26, 2006. The entire disclosures of each of the above applications are incorporated herein by reference.

BACKGROUND OF THE INVENTION

1. Technical Field of the Invention

The present invention relates to a method and apparatus for estimating behaviors of a vehicle, such as a direction of a vehicle or an area occupied by the vehicle on the local coordinate system, by using GPS (Global Positioning System) signals. In the present invention, the local coordinate system includes the LLS (local-level system), ENU (east-north-up), and Universal Transverse Mercator.

2. Related Art

A technique is known in which a GPS (global positioning system) antenna is provided on a vehicle to receive the GPS signals transmitted from a satellite, and vehicle conditions are estimated based on the received GPS signals.

Japanese Patent Laid-Open Publication No. 2005-186739, for example, discloses a technique for estimating traveling speed of a vehicle based on an actual location of the vehicle, which is specified by the GPS signals, and for determining the vehicle conditions (primarily, tire pressure) based on the traveling speed.

In the conventional art, the actual location determined based on the GPS signals have merely been indicated as a point. This has only enabled estimation on the actual location or the traveling speed of a vehicle with the location of the GPS antenna as a reference. Thus, the conventional art has not come up to estimating vehicle behaviors, such as a direction of a vehicle or an area occupied by the vehicle on the local coordinate system.

Estimating vehicle behaviors, such as a direction of a vehicle or an area occupied by the vehicle on the local coordinate system is advantageous in controlling the vehicle well to achieve stability of traveling, for example.

SUMMARY OF THE INVENTION

The present invention has been made to achieve the issue mentioned above, and has as its object to provide a method and apparatus for estimating behaviors of a vehicle, such as a direction of a vehicle or an area occupied by the vehicle on the local coordinate system, by using GPS signals.

In order to achieve the issue mentioned above, as an aspect of the present invention, there is provided a vehicle-behavior estimating method comprising a method of estimating a direction along which a vehicle runs. The method comprises steps of calculating velocity vectors at two or more mutually-different positions of the vehicle, respectively, by using GPS (Global Positioning System) signals received by two or more GPS antennas located at the mutually different positions of the vehicle; calculating positions of the GPS antennas in a local geodetic coordinate on the basis of the calculated velocity vectors, the positions of the GPS antennas corresponding to the velocity vectors; and calculating the direction of the vehicle in the local based on the estimated positions of the GPS antennas.

By way of example, the two or more mutually-different positions of the vehicle are two positions consisting of a front-side position of the vehicle and a read-side position of the vehicle and the GPS antennas are two in number.

Use of this method may enable estimation of a direction of a longitudinal axis of the vehicle based on a line connecting the positions of the GPS antennas.

For example, where the GPS antennas are located along the longitudinal axis of a vehicle, the direction of the longitudinal axis of the vehicle can be defined by the line connecting the positions of the GPS antennas.

As is well known, velocity vectors can be derived from the GPS signals with high accuracy. Therefore, use of the high-accuracy velocity vectors enables high-accuracy estimation of the positions of the GPS antennas and the vehicle direction.

In measuring the positions through the position estimating procedure mentioned above, the estimating method further comprises a step of calculating reference positions of the GPS antennas by using the calculated velocity vectors. In this case, the position calculating step calculates the positions of the GPS antennas in the local geodetic coordinate by integrating the calculated velocity vectors with respect to a unit time and displacing the reference positions of the GPS antennas, respectively, by amounts of the integrated velocity vectors, the displaced positions corresponding respectively to the positions of the GPS antennas in the local geodetic coordinate.

This enables estimation on the positions of the GPS antennas on the local coordinate system, which positions correspond to the respective velocity vectors.

The "reference positions of the GPS antennas" may be predetermined positions, but may be adjusted as needed.

For example, where two GPS antennas are located along the longitudinal axis of the vehicle, the following method can be used.

In this method, there is a further step of determining whether or not each of the calculated velocity vectors is within a predetermined threshold range. In this case, when it is determined that the each of the calculated velocity vectors is within a predetermined threshold range, the reference position calculating step includes a step of i) setting a predetermined position of the local geodetic coordinate to a first reference position of one of the two GPS antennas and ii) setting a second reference position of the other of the two GPS antennas by displacing the first position-being-referenced by a distance between the two GPS antennas toward the other GPS antenna from the first position-being-referenced along a direction of the calculated velocity vectors.

Thus, the reference positions of the respective GPS antennas can be adjusted at a stage where the GPS antennas located along the longitudinal axis of the vehicle have been displaced while their velocity vectors have approximate values, that is, at a stage where the vehicle can be regarded as traveling straight ahead.

Further, in order to achieve the issue mentioned above, as another aspect the present invention, there is provided a vehicle-behavior estimating method comprises steps of: calculating velocity vectors at two or more mutually-different positions of the vehicle, respectively, by using GPS (Global Positioning System) signals received by two or more GPS antennas located at the mutually different positions of the vehicle; and calculating the direction of the vehicle in a local geodetic coordinate by performing calculation based on a formula of:

$$\theta = \arctan\left[-\frac{V1\_e - V2\_e}{V1\_n - V2\_n}\right],$$

wherein V1 and V2 are the velocity vectors, V1_e and V1_n are respectively components of the velocity vector V1 in east-west and north-south directions of the local geodetic coordinate, V2_e and V2_n are respectively components of the velocity vector V2 in the east-west and north-south directions of the local geodetic coordinate, and θ is an angle corresponding to the direction of the vehicle in the local geodetic coordinate.

According to this aspect, the method of estimating vehicle behaviors, use of only the velocity vectors may enable definition of the line connecting the positions of the GPS antennas at the front and the rear of the vehicle.

Where the two GPS antennas are located along the longitudinal axis of the vehicle, use of only the velocity vectors may enable estimation on the inclination of the longitudinal axis of the vehicle with respect to the local coordinate system, that is, estimation on the vehicle direction on the local coordinate system.

The direction of the vehicle herein is estimated based on the angle of the longitudinal axis of the vehicle with respect to a direction along which the longitude increases/decreases (hereinafter is referred to as an "east-west direction") as a reference direction on the local coordinate system. Alternatively, however, the direction may be estimated based on the angle of the longitudinal axis of the vehicle with respect to a direction along which the latitude increases/decreases (hereinafter is referred to as a "north-south direction") as a reference direction on the local coordinate system. To this end, other formulas may be used to determine such an angle.

As is well known, velocity vectors can be derived from the GPS signals with high accuracy. Therefore, the angle determined by the formula, which is based on such high-accuracy velocity vectors, can be regarded as very accurately providing the inclination of the longitudinal axis of the vehicle with respect to the local coordinate system.

When the velocity vectors V1 and V2 have approximate values, the calculation of the angle using Formula 7 may result in "arctan (0/0)". Accordingly, the obtained value may be indeterminate, disabling the estimation on the inclination mentioned above.

In order to prevent such a situation, the following method may be employed.

In this method, there is a further step of calculating reference positions of the GPS antennas by using the calculated velocity vectors, wherein the direction calculating means calculates the direction of the vehicle in the local geodetic coordinate by performing calculation based on a formula of:

$$\theta = \arctan\left[-\frac{V0\_e}{V0\_n}\right],$$

wherein V0_e and V0_n are respectively components of either the velocity vector V1 or V2 in east-west and north-south directions of the local geodetic coordinate and θ is an angle corresponding to the direction of the vehicle in the local geodetic coordinate.

Thus, even when the velocity vectors V1 and V2 have approximate values, the inclination can be estimated.

It is preferable that the estimating method further comprises a step of calculating an area spatially occupied in the local geodetic coordinate based on both the calculated direction of the vehicle and a parameter indicative of at least a size of the vehicle.

Thus, it is possible to estimate not only the inclination of the vehicle on the local coordinate system but also the area occupied by the vehicle on the local coordinate system. This may lead to an interpretation of the vehicle as being a rigid body present on the local coordinate system. As a result, the behaviors of the vehicle can be checked based on much more pieces of information.

The "parameters indicating the dimension of the vehicle" herein means those parameters that can specify the area extending from the axis, as a reference, of the vehicle. The parameters include the width, length and height of the vehicle, for example, which are given in advance.

Another aspect of the present invention, there is provided a vehicle-behavior estimating apparatus comprising the structures that function in the same manner as the above or provides the identical or similar advantages at those stated above.

The vehicle-behavior estimating apparatus for estimating a direction along which a vehicle runs has the following basic structure. The apparatus comprises a velocity calculating block calculating velocity vectors at two or more mutually-different positions of the vehicle, respectively, by using GPS (Global Positioning System) signals received by two or more GPS antennas located at the mutually different positions of the vehicle; a position calculating block calculating positions of the GPS antennas in a local geodetic coordinate on the basis of the calculated velocity vectors, the positions of the GPS antennas corresponding to the velocity vectors; and a direction calculating block calculating the direction of the vehicle in the local based on the estimated positions of the GPS antennas.

BRIEF DESCRIPTION OF THE DRAWINGS

In the accompanying drawings:

FIG. 5 is a flow diagram illustrating a direction estimation procedure (Program 2) according to a second embodiment of the present invention;

DETAILED DESCRIPTION OF THE PREFERRED EMBODIMENTS

With reference to FIGS. 1-5, a first embodiment according to a method and an apparatus for estimating behaviors of a vehicle will now be described.

(1) Entire Configuration

In the first embodiment, the estimating apparatus and method according to the present invention is reduced into practice as an apparatus and method estimating directions of a vehicle as well as areas spatially occupied by the vehicle. Hereinafter, this apparatus is referred to as a vehicle-direction estimating apparatus.

Figure 1:
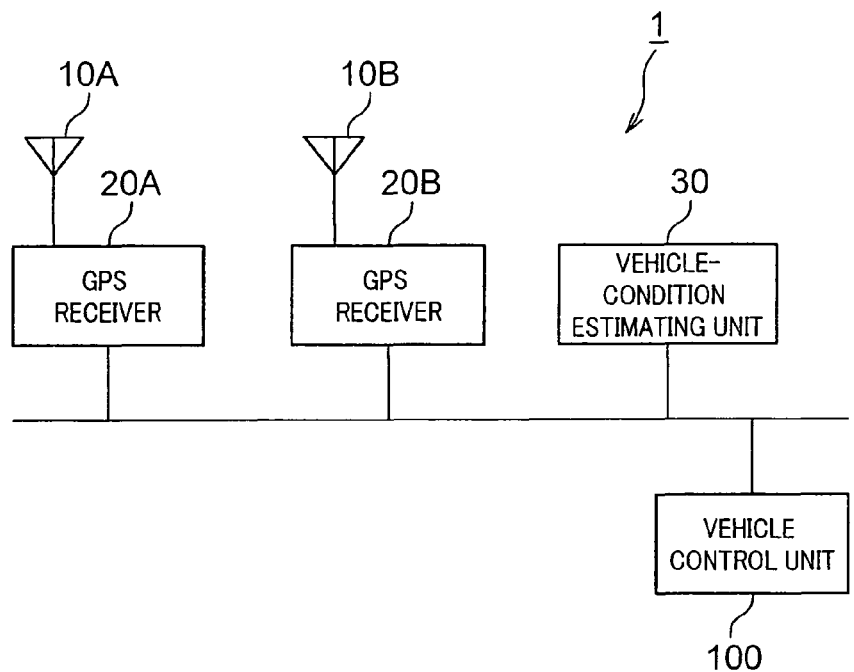
FIG. 1 is a block diagram illustrating a configuration of a vehicle-behavior estimating apparatus of the present invention.

A vehicle direction estimating apparatus 1 is an apparatus loaded on a vehicle. This apparatus includes, as shown in FIG. 1, two GPS (global positioning system) antennas 10A and 10B, two GPS receivers 20A and 20B eclectically connected to the respective GPS antennas 10A and 10B, and a vehicle-condition estimating unit 30 that will be described later. These components are mutually connected for communication through a network (e.g., CAN (controller area network)).

Figure 2:
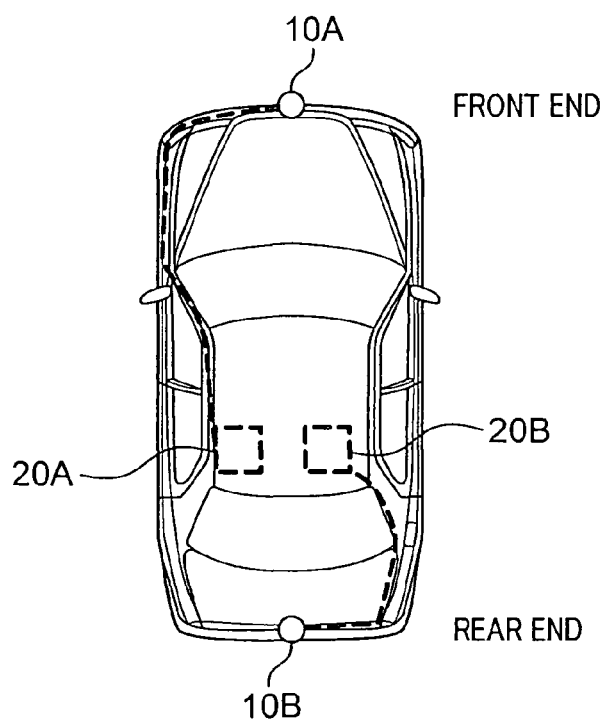
FIG. 2 is an illustration indicating the locations of GPS antennas and GPS receivers of the present invention.

As shown in FIG. 2, each of the GPS antennas 10A and 10A can be located at any position along a longitude direction of the vehicle. In the present embodiment, those two GPS antennas 10A and 10B are located at the front and rear ends of the vehicle. At these end locations, each of the GPS antennas 10A and 10B receives GPS signals from GPS satellites.

The GPS receivers 20A and 20B are arranged in the interior of the vehicle compartment to receive the GPS signals through the GPS antennas 10A and 10B. Further, each GPS receiver 20A (20B) acquires, as needed, a parameter indicative of the velocity vector at the position where each of the GPS antennas 10A and 10B is located, based on the received GPS signals and informs the vehicle-condition estimating unit 30 of the parameter.

The vehicle-condition estimating unit 30 is made up, for example, of a known microcomputer to control the entire operation of the vehicle direction estimating apparatus 1. The microcomputer is provided with a CPU (central processing unit) and memories in which previously given software programs, temporary data necessary for processing in the CPU, and other necessary data are stored. The CPU, that is, the unit 30 performs processes that will be described later in accordance with a program previously stored in an incorporated memory.

(2) Direction Estimating Procedure

The following is a description on direction estimation procedures performed by the vehicle-condition estimating unit 30. Contents of the direction estimation procedures are partially different from each other depending on the program stored in the memory which is incorporated in the vehicle-condition estimating unit 30. Therefore, a description on the procedures is separately provided for each program.

It should be appreciated that the direction estimation procedure is repeatedly performed at intervals upon activation of the vehicle direction estimating apparatus 1 in response to turning on the ignition switch of the vehicle.

(2-1) First Program

Figure 3:
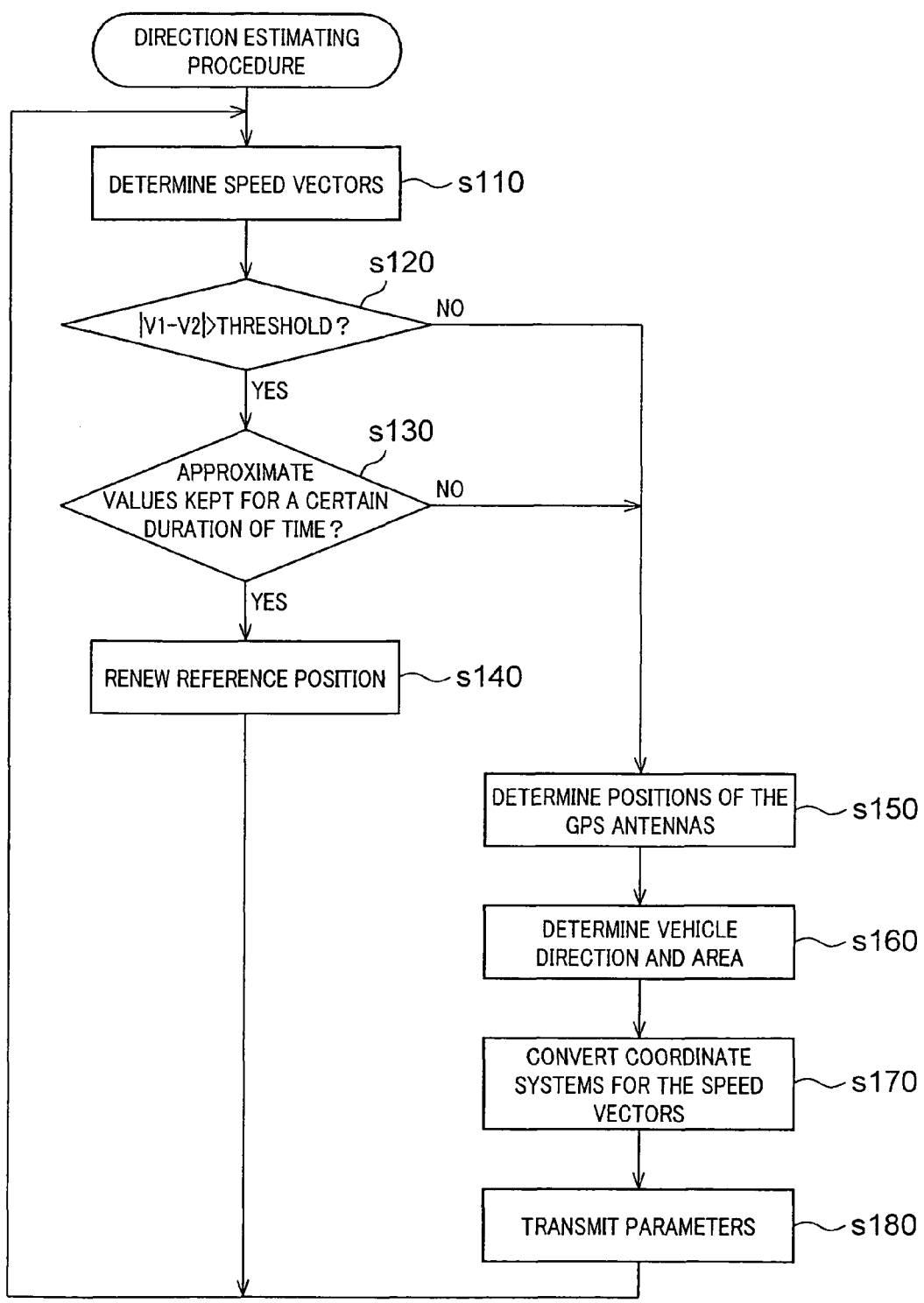
FIG. 3 is a flow diagram illustrating a direction estimation procedure (Program 1) according to a first embodiment of the present invention.

With reference to FIG. 3, hereinafter is described a procedure of a first program for estimating behaviors of a vehicle. In the present and the subsequent embodiments, the estimation on the behaviors is mainly focused on directions of a vehicle and an area spatially occupied by a vehicle on the local coordinate system (such as LLS (local-level system), ENU (east-north-up), or Universal Transverse Mercator.

With the start of the direction estimation procedure, velocity vectors are determined for the positions where the respective GPS antennas 10A and 10B are located (step S110 in FIG. 3). At this step, the velocity vectors V1 and V2 are determined, based on the parameters informed by the GPS receivers 20A and 20B, for the positions where the respective GPS antennas 10A and 10B are located (see FIG. 4A).

Hereinafter, the velocity vector derived from the GPS signals which are received by the GPS antenna 10A located at the front end of the vehicle is referred to as "V1", and the velocity vector derived from the GPS signals which are received by the GPS antenna 10B located at the rear end of the vehicle is referred to as "V2".

Subsequently, checking is performed as to whether or not the velocity vectors determined at step S110 have approximate values that fall within a predetermined threshold range ($|V1-V2|<$threshold) (step S120).

If it is determined, at step S120, that the velocity vectors have approximate values that fall within the predetermined threshold range (step S120: YES), and if the state of being the approximate values is kept for a certain duration of time (e.g., 5 seconds) (step S130: YES), reference positions of the respective GPS antennas 10 are renewed (step S140).

In the present embodiment, the parameters indicating the reference positions of the individual GPS antennas 10A and 10B are stored in the memory incorporated in the vehicle-condition estimating unit 30. At step S140, a predetermined position (e.g., the origin) on the local coordinate system is renewed as a parameter indicating the reference position of one (10A) of the GPS antennas 10A and 10B. The reference position is displaced to the side of the other antenna 10B along the velocity vector determined at step S110 by a distance L defined between the positions of the GPS antennas 10A and 10B, of which antenna-to-antenna distance corresponds to the entire length of the vehicle in the present embodiment. The displaced position is then renewed as a parameter indicating the reference position of the other GPS antenna 10B.

Figure 4A:
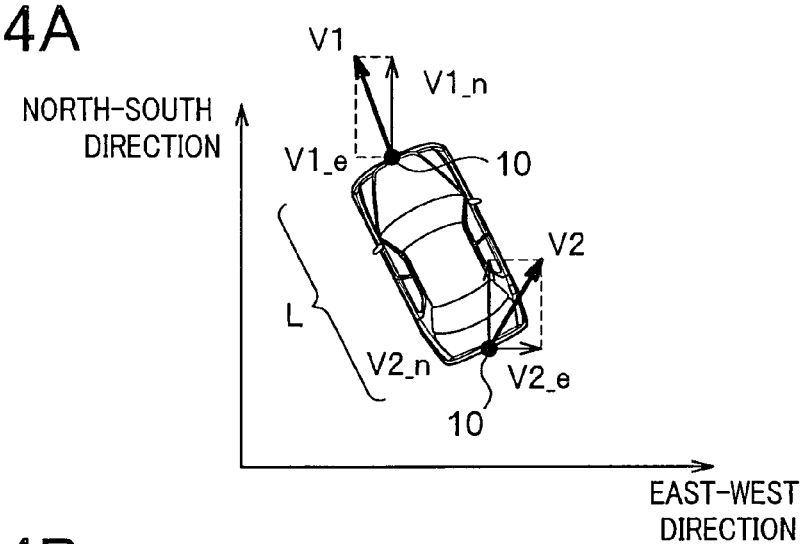
FIGS. 4A to 4C are illustrations each indicating a direction of a vehicle on the local coordinate system (two-dimensional coordinates) according to the first embodiment of the present invention.
Figure 4B:
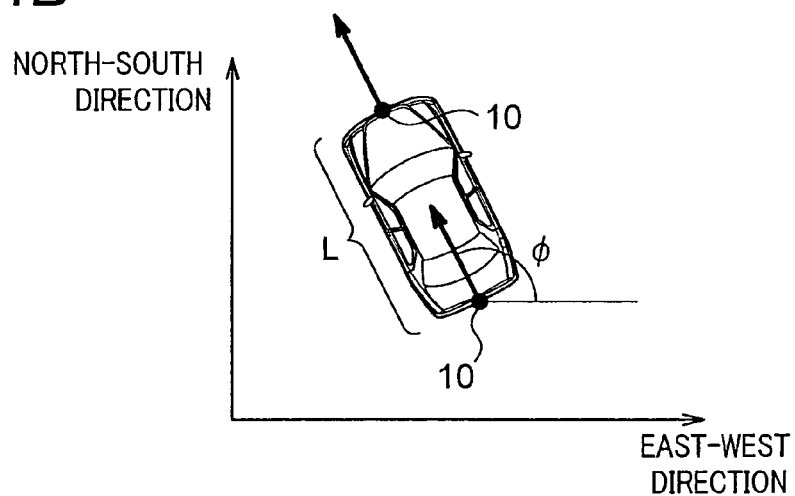
Figure 4C:
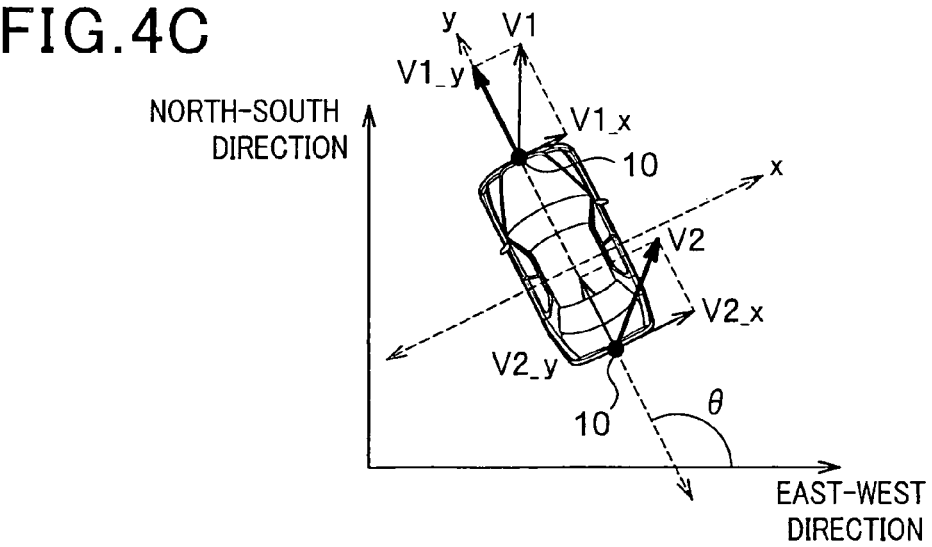

For example, when a position vector indicating the reference position of the GPS antenna 10A located at the front end of the vehicle is "P1$d$", and when a position vector indicating the reference position of the GPS antenna 10B located at the rear end of the vehicle is "P2$d$", and further when this "P2$d$" is regarded as the predetermined position on the local coordinate system, respective directional components (i.e. east-west directional components and north-south directional components) of the reference positions P1$d$ and P2$d$ are calculated from the following Formula (1):

$$\begin{bmatrix} P1d\_e \\ P1d\_n \end{bmatrix} = \begin{bmatrix} L\cos\phi + P2d\_e \\ L\sin\phi + P2d\_n \end{bmatrix}, \quad (1)$$

where "P*d_e" (throughout the present specification, "*" indicates 1 or 2) is a position vector indicating the reference position in the east-west direction, "P*d_n" is a position vector indicating the reference position in the north-south direction, and "$\phi$" is an angle made between the velocity vector V2 and the east-west direction (see FIG. 4B). This angle "$\phi$" is defined by an angle (azimuth) made between the east-west directional component and the north-south directional component of the velocity vector derived from the GPS signals located at the rear end reference position P2$d$ of the vehicle.

Subsequent to step S140, control returns to step S110.

If the velocity vectors are determined, at step S120, as not being the approximate values that fall within the predetermined threshold range (step S120: NO), or if the velocity vectors are determined as being the approximate values that fall within the predetermined threshold range but the state of being the approximate values is not kept for a certain duration of time (step S130: NO), the positions of the respective GPS antennas 10A and 10B on the local coordinate system can be determined (step S150).

Specifically, at step S150, the velocity vectors (V1, V2) determined at step S110 are each integrated with respect to a unit time. Then, the reference positions (P1d, P2d) of the GPS antennas 10A and 10B corresponding to the respective velocity vectors are each displaced by amounts of the integral values. The displaced positions are then determined as the positions of the respective GPS antennas 10A and 10B on the local coordinate system.

More specifically, a position vector "P1" indicating the position of the GPS antenna 10A located at the front end of the vehicle is calculated by the following Formula (2). And a position vector "P2" indicating the position of the GPS antenna 10B located at the rear end of the vehicle is calculated by the following Formula (3).

$$P1 = \int V1 dt + P1d \tag{2}$$

$$P2 = \int V2 dt + P2d \tag{3}$$

Subsequent to the estimation of the positions of the respective GPS antennas 10A and 10B at step S150, the direction of the vehicle and the two- or three-dimensional area spatially occupied by the vehicle are determined based on the estimated positions (step S160).

Specifically, at step S160, the positions estimated at step S150 are connected by a line, and the direction of the line on the local coordinate system is determined as a direction indicating the direction of the vehicle. More specifically, at step S160, the positions estimated at step S150 are connected by a line, and an angle θ made between a line orthogonal to this connected line and a line extending in the east-west direction (see FIG. 4C) is determined as a direction indicating the direction of the vehicle on the local coordinate system. This angle θ is calculated from the following formula (4):

$$\tan\theta = \frac{\Delta Pn}{\Delta Pe} = \frac{P1\_n - P2\_n}{P1\_e - P2\_e} \tag{4}$$

$$\therefore \theta = \arctan\left[\frac{P1\_n - P2\_n}{P1\_e - P2\_e}\right],$$

where "P*_e" is a position vector indicating a position in the east-west direction along which the longitude increases or decreases, and "P*_n" is a position vector indicating a position in the north-south direction along which the latitude increases or decreases.

Also, at step S160, an area spatially occupied by the vehicle on the local coordinate system is determined based on the inclination of the vehicle axis fixed by the vehicle direction that has been calculated by using Formula (4) and based on the predetermined parameters indicating the dimension of the vehicle (e.g., the width, length and height of the vehicle).

Subsequently, the velocity vectors determined at step S110 are converted to the x-y coordinate system (see FIG. 4C) with the vehicle axis as a reference, the vehicle axis being derived from the vehicle direction which has been determined at step S160 (step S170). At step S170, the conversion of the coordinate systems is performed by using the following Formulas (5) and (6):

$$\begin{bmatrix} V1\_y \\ V1\_x \end{bmatrix} = \begin{bmatrix} \cos\theta & -\sin\theta \\ \sin\theta & \cos\theta \end{bmatrix} \begin{bmatrix} V1\_e \\ V1\_n \end{bmatrix} \tag{5}$$

$$\begin{bmatrix} V2\_y \\ V2\_x \end{bmatrix} = \begin{bmatrix} \cos\theta & -\sin\theta \\ \sin\theta & \cos\theta \end{bmatrix} \begin{bmatrix} V2\_e \\ V2\_n \end{bmatrix}, \tag{6}$$

where "V*_x" is a velocity vector in a direction of the x-axis, "V*_y" is a velocity vector in a direction of the y-axis, "V*_e" is a velocity vector in the east-west direction, and "V*_n" is a velocity vector in the north-south direction.

The parameters indicating the velocity vectors, which have been obtained by the conversion at step S170, and the parameters indicating the vehicle area, which have been determined at step S160, are transmitted to a vehicle control unit 100 which is connected through the network (step S180), as shown in FIG. 1. Then, control returns to step S110. The vehicle control unit 100 that has received the parameters carries out various processes based on the parameters to control the vehicle movements.

(2-2) Second Program

With reference to FIG. 5, hereinafter is described a procedure of direction estimation which is carried out according to a second program. This second program, which is modified from the first program, is substituted for the first program.

With the start of the direction estimation procedure, the velocity vectors are determined, as at step S110 mentioned above, with respect to the positions where the respective GPS antennas 10A and 10B are located (step S210).

Subsequently, checking is performed as to whether or not the velocity vectors determined at S110 have approximate values that fall within a predetermined threshold range (|V1−V2|<threshold) (step S220).

If the velocity vectors are determined as not having the approximate values that fall within the predetermined threshold range (step S220: NO), the velocity vectors determined at step S210 are used as bases to determine an inclination of the longitudinal axis of the vehicle with respect to the local coordinate system, and an area spatially occupied by the vehicle (step S230).

Specifically, at step S230, based on the directional components of the velocity vectors estimated at step S210, the angle θ (see FIG. 4C) made between a line orthogonal to the longitudinal axis of the vehicle and a line extending to the north-south direction on the local coordinate system is calculated by using the following Formula (7). The inclination indicative of this angle θ is determined as being the inclination of the longitudinal axis of the vehicle with respect to the local coordinate system.

$$\theta = \arctan\left[-\frac{V1\_e - V2\_e}{V1\_n - V2\_n}\right] \tag{7}$$

At step S230, an area spatially occupied by the vehicle on the local coordinate system is also determined based on the inclination of the vehicle axis reflecting the direction of the vehicle that has been calculated by using Formula (7) and based on the predetermined parameters indicating the dimension of the vehicle (e.g., the width, length and height of the vehicle).

It should be appreciated that Formula (7) provided above has been obtained as follows.

First, provided that the locations of the GPS antennas 10A and 10B remain unchanged and the distance L defined between the GPS antennas 10A and 10B is constant, the following Formula (8) is established:

$$(P1\_e - P2\_e)^2 + (P1\_n - P2\_n)^2 = L \tag{8}$$

Differentiation of both sides of Formula (8) with respect to a unit time "t" establishes the following Formula (9):

$$2 \cdot (P1\_e - P2\_e) \cdot \left[\frac{dP1\_e}{dt} - \frac{dP2\_e}{dt}\right] + \\ 2 \cdot (P1\_n - P2\_n) \cdot \left[\frac{dP1\_n}{dt} - \frac{dP2\_n}{dt}\right] = 0 \quad (9)$$

The relation expressed by the following Formula (10) can be derived from Formulas (8) and (9):

$$\frac{P1\_n - P2\_n}{P1\_e - P2\_e} = -\left[\frac{dP1\_e}{dt} - \frac{dP2\_e}{dt}\right] \bigg/ \left[\frac{dP1\_n}{dt} - \frac{dP2\_n}{dt}\right] \quad (10)$$

The left side of Formula (10) indicates tan θ. Meanwhile, the relations expressed by the following Formulas (11) to (14) are established. Accordingly, by working out the angle θ mentioned above with these formulas, the above Formula 7 can be derived.

$$\frac{dP1\_e}{dt} = V1\_e \quad (11)$$

$$\frac{dP2\_e}{dt} = V2\_e \quad (12)$$

$$\frac{dP1\_n}{dt} = V1\_n \quad (13)$$

$$\frac{dP2\_n}{dt} = V2\_n \quad (14)$$

The inclination of the vehicle in the present embodiment is determined based on the angle of the longitudinal axis of the vehicle with respect to the east-west direction as a reference direction on the local coordinate system. Alternatively, however, the inclination may be determined based on the angle of the longitudinal axis of the vehicle with respect to the north-south direction as a reference direction on the local coordinate system. To this end, other formulas may be used to determine such an angle.

Subsequently, the velocity vectors determined at step S210 are converted to the x-y coordinate system (see FIG. 4C) with the vehicle axis as a reference, the vehicle axis being derived from the inclination determined at step S230 (step S240). At step S240, the conversion of the coordinate systems is performed by using the Formulas (5) and (6) as at step S170.

Similar to step S180, the parameters indicating the velocity vectors, which have been obtained by the conversion at step S240, and the parameters indicating the vehicle area, which have been determined at steps S230 and S260, are transmitted to the vehicle control unit 100, which is connected through the network (step S250). Then, control returns to step S210.

If the velocity vectors are determined, at step S220, as having the approximate values that fall within the predetermined threshold range (step S220: YES), either one of the velocity vectors determined at step S210 is used as a basis to determine the inclination of the longitudinal axis of the vehicle with respect to the local coordinate system (step S260).

At step S260, either one of the velocity vectors estimated at step S210 is selected at random, or a predetermined velocity vector is selected. Based on the directional components of the selected velocity vector (referred to as "V0"), the angle θ (see FIG. 4C) made between a line orthogonal to the longitudinal axis of the vehicle and a line extending to the north-south direction on the local coordinate system is calculated using the following Formula (15). The inclination indicative of this angle θ is determined as reflecting the inclination of the longitudinal axis of the vehicle with respect to the local coordinate system.

$$\theta = \arctan\left[-\frac{V0\_e}{V0\_n}\right]. \quad (15)$$

The above Formula (15) is obtained by merely rendering one of the velocity vectors in Formula (7) to be "0". In Formula (15), "V0_e" is the velocity vector in the east-west direction, and "V0_n" is the velocity vector in the north-south direction.

At step S260, an area spatially occupied by the vehicle on the local coordinate system is also determined based on the inclination of the vehicle axis that has been calculated by using Formula (15) and based on the predetermined parameters indicating the dimension of the vehicle (e.g., the width, length and height of the vehicle).

Subsequent to the process at step S260, control proceeds to step S240.

(3) Advantages

In the vehicle-direction estimating apparatus 1 configured as described above, the GPS antennas 10A and 10B are located along the longitudinal direction of the vehicle. Thus, the direction of the longitudinal axis of the vehicle can be derived from the line connecting the positions of the GPS antennas 10A and 10B (see step S160 of FIG. 3 and steps S230 and S260 of FIG. 5).

As is well known, the velocity vectors can be derived from the GPS signals with high accuracy. Thus, the estimation of the positions based on such high-accuracy velocity vectors, as described above, leads to deriving the positions of the GPS antennas 10 and the vehicle angle with high accuracy.

In the direction estimation procedure of Program 1, the velocity vectors determined at step S110 of FIG. 3 are each integrated with respect to a unit time. Then, the reference positions of the GPS antennas 10A and 10B corresponding to the respective velocity vectors are displaced by the integral values. The displaced positions are determined as the positions of the respective GPS antennas 10A and 10B on the local coordinate system. Thus, use of the velocity vectors may enable estimation of the positions of the GPS antennas 10A and 10B on the local coordinate system, of which positions correspond to the respective velocity vectors.

Further, in the direction estimation procedure of the program, where the velocity vectors determined at step S110 of FIG. 3 have approximate values that fall within a predetermined threshold range ("YES" at step S120 of FIG. 3), the reference positions of the respective GPS antennas 10A and 10B can be renewed. The state where both of the velocity vectors have approximate values may be a state where the vehicle axis on which the velocity vectors reside and the vehicle's traveling direction are approximate, or, may be a state where the vehicle can be regarded as traveling straight ahead. Therefore, in the direction estimation procedure of the first program, the reference positions of the respective GPS antennas 10A and 10B can be adjusted at a stage where the vehicle can be regarded as traveling straight ahead.

In the direction estimation procedure of the second program, use of only the velocity vectors determined at step S210 of FIG. 5 can determine the inclination of the longitudinal axis of the vehicle with respect to the local coordinate system. That is, use of only the velocity vectors can determine the vehicle direction on the local coordinate system.

As is well known, the velocity vectors can be derived from the GPS signals with high accuracy. Therefore, the angle determined on the basis of such a high-accuracy velocity vectors can very accurately indicate the inclination of the longitudinal axis of the vehicle with respect to the local coordinate system.

In the direction estimation procedure of the second program, where the velocity vectors V1 and V2 have approximate values that fall within the predetermined range, the vehicle direction can be determined using only either one of the velocity vectors ("YES" at step S220 to step S260 of FIG. 5).

In cases where the velocity vectors V1 and V2 have approximate values, determining the inclination using Formula 7 as in the case where the vectors are not approximate may result in "arctan (0/0)". Thus, the obtained value may be indeterminate, disabling the determination on the inclination.

Under such circumstances, by providing the above configuration which enables estimation on the vehicle direction using only either one of the velocity vectors, the inclination of the longitudinal axis of the vehicle with respect to the local coordinate system can be determined even when the velocity vectors V1 and V2 have approximate values.

The above configuration may enable estimation on the area spatially occupied by the vehicle on the local coordinate system based on the vehicle direction or inclination and on the parameters indicating the dimension of the vehicle (see step S160 of FIG. 3 and steps S230 and S260 of FIG. 5).

Thus, in addition to the vehicle inclination on the local coordinate system, the area spatially occupied by the vehicle on the coordinates can be estimated. This may lead to an interpretation of the vehicle as being a rigid body present on the local coordinate system. In this way, the behaviors of the vehicle can be checked based on much more pieces of information, so that the vehicle behaviors can be estimated more precisely as positional relationships to environmental factors such as the shapes of roads along which vehicles are running now and/or obstacles positioned before running vehicles.

(Modifications)

Some embodiments of the present invention have been described above. However, it should be appreciated that the present invention is not limited to the embodiments described above but may be implemented in various embodiments as far as the embodiments fall within the technical scope of the present invention. Some examples of modifications are provided below.

The embodiment described above has exemplified the configurations in each of which the GPS antennas 10A and 10B have been located at the front and the rear ends of the vehicle. The GPS antennas 10A and 10B may, however, only have to be located along the longitudinal axis of the vehicle being distanced from each other, and thus may be located at positions other than the front and the rear ends of the vehicle.

In this case, the direction of the longitudinal axis of the vehicle may be estimated based on angular differences between the longitudinal axis of the vehicle and the line connecting the two GPS antennas.

The embodiment described above has exemplified the configurations in each of which the two GPS antennas 10A and 10B have been located along the longitudinal axis of the vehicle. Alternatively, however, more than two GPS antennas may be arranged along the longitudinal axis or the lateral axis of the vehicle, so that the GPS signals received through these GPS antennas can be utilized to perform the direction estimation procedure described above.

Figure 6A:
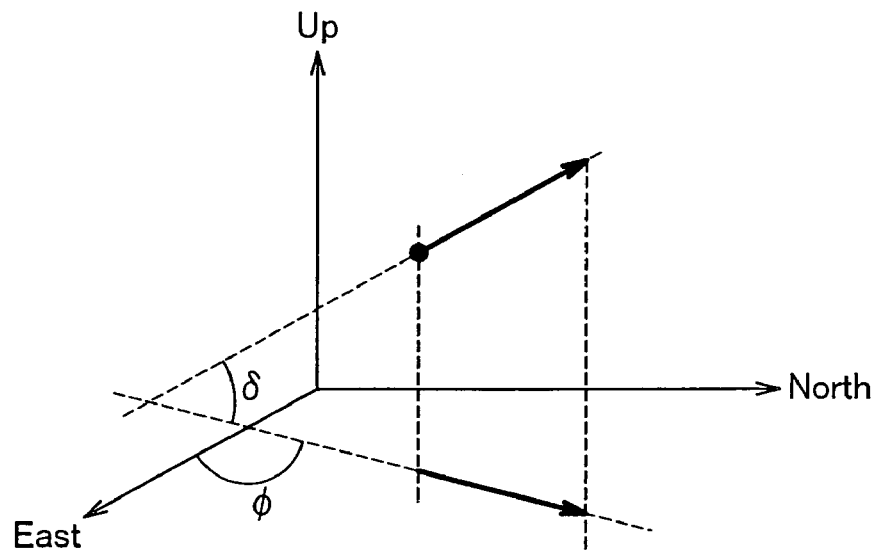
FIGS. 6A and 6B are illustrations each indicating a direction of a vehicle on the local coordinate system (three-dimensional coordinates) according to another embodiment of the present invention.
Figure 6B:
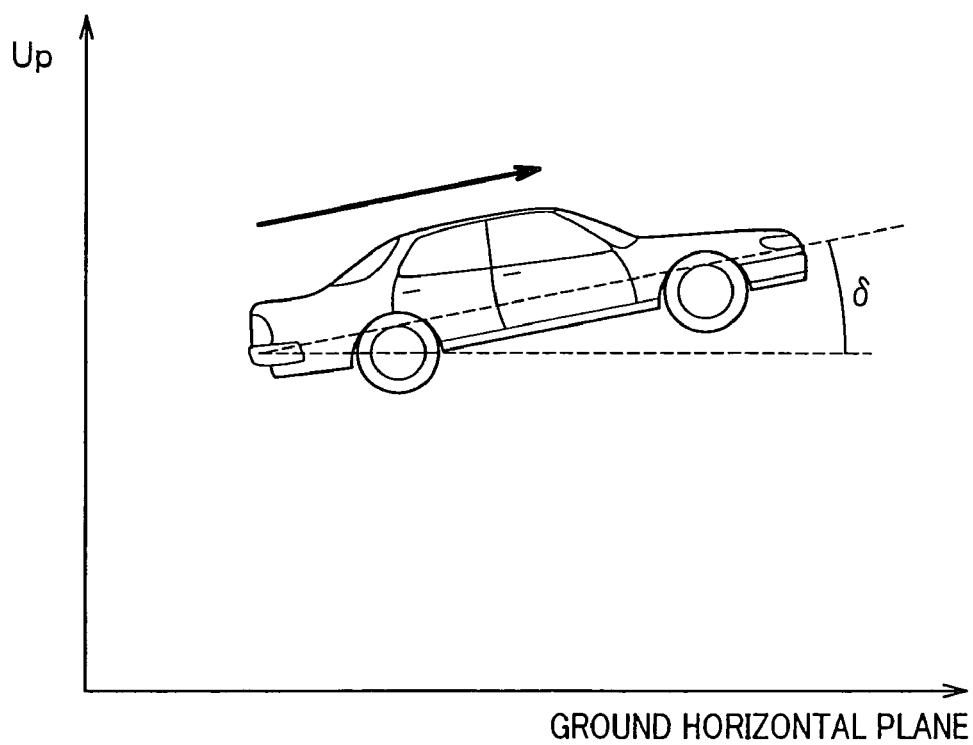

The embodiment described above has exemplified the configurations in each of which the vehicle direction has been estimated on the two-dimensional coordinates, or the local coordinate system consisting of the east-west and north-south directional components. Alternatively, since three-dimensional velocity vectors can be derived from the GPS signals, the vehicle direction estimating apparatus may be configured to employ three-dimensional coordinates to estimate both a first vehicle angle φ in the horizontal plane including the east-west and north-south directions and a second vehicle angle δ in a vertical plane vertical to the horizontal plane (see FIGS. 6A and 6B).

Figure 7A:
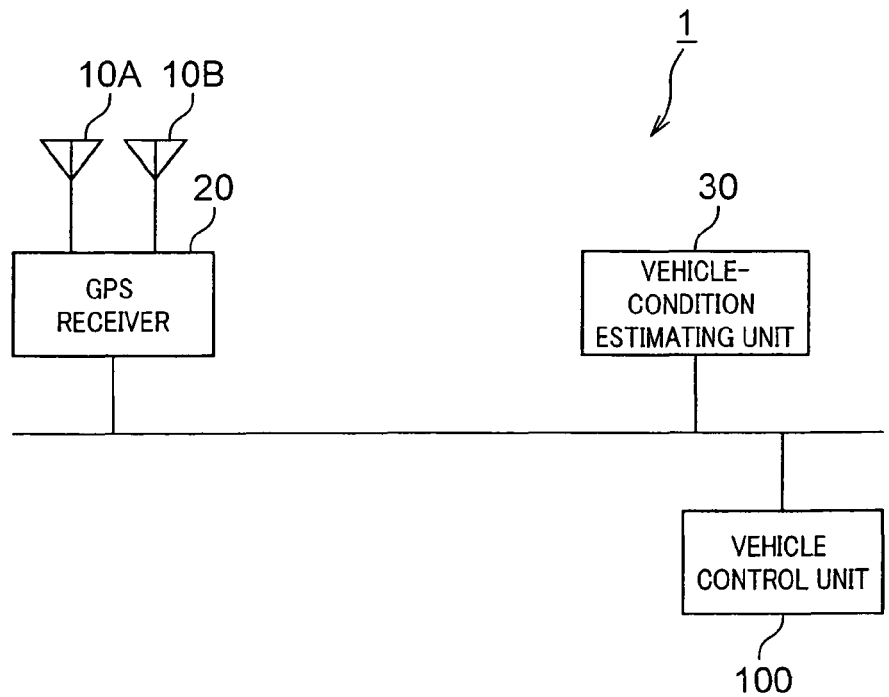
FIGS. 7A and 7B are block diagrams each illustrating a configuration of a vehicle-behavior estimating apparatus according to still another embodiment of the present invention.

The embodiment described above has exemplified the configurations in each of which two GPS receivers 20A and 20B have been provided for the respective GPS antennas 10A and 10B. Alternatively, however, a single GPS receiver 20 may be used to receive the GPS signals from the individual GPS antennas 10A and 10B for acquiring parameters as needed. In this case, from whichever antenna 10A (10B) the GPS signals may be received, each parameter should be transmitted to the vehicle-condition estimating unit 30 in the state that the GPS antenna 10A (10B) that has received the parameter can be identified (see FIG. 7A).

Figure 7B:
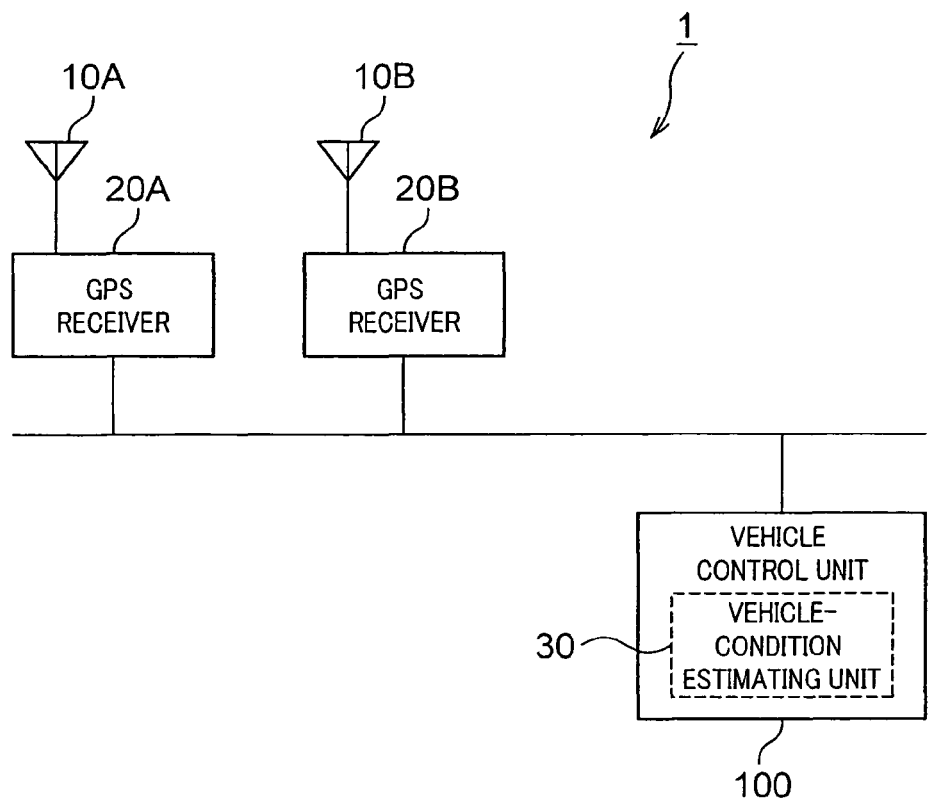

Finally, the embodiment described above has exemplified the configurations in each of which the vehicle direction estimating apparatus 1 has been provided as a separate body. Alternatively, the vehicle direction estimating apparatus 1 may partially be integrated, for example, into the vehicle control unit 100. As a specific example, the vehicle-condition estimating unit 30 may be integrated into the vehicle control unit 100 (see FIG. 7B).

Correlations between the embodiment and the present invention are as follows. In the embodiment described above, step S110 of FIG. 3 corresponds to the velocity estimating procedure, or the velocity estimating means. Step S150 of FIG. 3 corresponds to the position estimating procedure, or the position estimating means. Step S160 of FIG. 3 corresponds to the direction estimating procedure, or the direction estimating means. Step S140 of FIG. 3 corresponds to the reference-determining procedure, or the reference-determining means.

Further, step S210 of FIG. 5 corresponds to the velocity estimating procedure, or the velocity estimating means. Steps S230 and S260 of FIG. 5 correspond to the direction estimating procedure, or the direction estimating means.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A method of estimating a direction of a longitudinal axis of a vehicle with respect to a local geodetic coordinate system, the method comprising:

calculating, by a vehicle-condition estimating unit, velocity vectors at two or more mutually-different positions of the vehicle, respectively, by using GPS (Global Positioning System) signals received by two or more GPS antennas located at the mutually different positions of the vehicle; and calculating, by the vehicle-condition estimating unit, the direction of the longitudinal axis of the vehicle in the local geodetic coordinate system by performing a calculation based on a formula of:

$$\theta = \arctan\left[-\frac{V1\_e - V2\_e}{V1\_n - V2\_n}\right],$$

wherein V1 and V2 are the velocity vectors, V1_e and V1_n are respectively components of the velocity vector V1 in east-west and north-south directions of the local geodetic coordinate system, V2_e and V2_n are respectively components of the velocity vector V2 in the east-west and north-south directions of the local geodetic coordinate system, and θ is an angle corresponding to the direction of the longitudinal axis of the vehicle in the local geodetic coordinate system.

2. The estimating method of claim 1, further comprising calculating reference positions of the GPS antennas by using the calculated velocity vectors, wherein the step of calculating the direction of the longitudinal axis of the vehicle calculates the direction of the longitudinal axis of the vehicle in the local geodetic coordinate system by performing a calculation based on a formula of:

$$\theta = \arctan\left[-\frac{V0\_e}{V0\_n}\right],$$

wherein V0_e and V0_n are respectively components of either the velocity vector V1 or V2 in the east-west and north-south directions of the local geodetic coordinate system and θ is an angle corresponding to the direction of the longitudinal axis of the vehicle in the local geodetic coordinate system.

3. The estimating method of claim 2, further comprising calculating an area spatially occupied in the local geodetic coordinate system based on both the calculated direction of the longitudinal axis of the vehicle and a parameter indicative of at least a size of the vehicle.

4. The estimating method of claim 1, further comprising calculating an area spatially occupied in the local geodetic coordinate system based on both the calculated direction of the longitudinal axis of the vehicle and a parameter indicative of at least a size of the vehicle.

5. An apparatus for estimating a direction of a longitudinal axis of a vehicle with respect to a local geodetic coordinate system, the apparatus comprising:

a vehicle-condition estimating unit is configured to calculate velocity vectors at two or more mutually-different positions of the vehicle, respectively, by using GPS (Global Positioning System) signals received by two or more GPS antennas located at the mutually different positions of the vehicle; and the vehicle-condition estimating unit is configured to calculate the direction of the longitudinal axis of the vehicle in the local geodetic coordinate system by performing a calculation based on a formula of:

$$\theta = \arctan\left[-\frac{V1\_e - V2\_e}{V1\_n - V2\_n}\right],$$

wherein V1 and V2 are the velocity vectors, V1_e and V1_n are respectively components of the velocity vector V1 in east-west and north-south directions of the local geodetic coordinate system, V2_e and V2_n are respectively components of the velocity vector V2 in the east-west and north-south directions of the local geodetic coordinate system, and θ is an angle corresponding to the direction of the longitudinal axis of the vehicle in the local geodetic coordinate system.

* * * * *